United States Patent
Nam et al.

(10) Patent No.: US 10,568,475 B2
(45) Date of Patent: Feb. 25, 2020

(54) CLEANER

(71) Applicant: LG ELECTRONICS INC., Seoul (KR)

(72) Inventors: Bohyun Nam, Seoul (KR); Namhee Kim, Seoul (KR); Jinju Kim, Seoul (KR); Hyeonjeong An, Seoul (KR); Jungbae Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/050,852

(22) Filed: Jul. 31, 2018

(65) Prior Publication Data

US 2018/0333025 A1    Nov. 22, 2018

Related U.S. Application Data

(63) Continuation of application No. 15/475,476, filed on Mar. 31, 2017.

(30) Foreign Application Priority Data

Mar. 31, 2016 (KR) .................. 10-2016-0039814
Jun. 7, 2016 (KR) .................. 10-2016-0070220

(51) Int. Cl.
*A47L 9/12* (2006.01)
*A47L 9/16* (2006.01)
(Continued)

(52) U.S. Cl.
CPC .................. *A47L 5/28* (2013.01); *A47L 5/24* (2013.01); *A47L 9/00* (2013.01); *A47L 9/12* (2013.01);
(Continued)

(58) Field of Classification Search
CPC . A47L 5/28; A47L 5/24; A47L 9/1608; A47L 9/22; A47L 9/2842; A47L 9/1641;
(Continued)

(56) References Cited

U.S. PATENT DOCUMENTS 3,454,978 A    7/1969 Kuwahara
5,062,870 A    11/1991 Dyson et al.
(Continued)

FOREIGN PATENT DOCUMENTS

CA    2917900    9/2010
CN    2920567 Y    7/2007
(Continued)

OTHER PUBLICATIONS

International Search Report in International Application No. PCT/K.R2017/003587, dated Jun. 29, 2017, 3 pages (with partial English translation).
(Continued)

*Primary Examiner* — David Redding
(74) *Attorney, Agent, or Firm* — Fish & Richardson P.C.

(57) ABSTRACT

A cleaner includes: a suction unit; a suction motor that generates suction force for sucking air through the suction unit and includes an impeller; a dust separation unit that includes one or more cyclone units generating cyclonic flow to separate dust from air flowing inside through the suction unit; a dust container that stores dust separated by the dust separation unit and is disposed under the suction motor; a battery disposed behind the dust container to supply power to the suction motor; and a handle disposed behind the suction motor, wherein a rotational axis of the impeller and an axis of the cyclonic flow vertically extend and an extension line from the rotational axis of the impeller passes through the one or more cyclone units.

30 Claims, 18 Drawing Sheets

(51) Int. Cl.
   *A47L 9/28*   (2006.01)
   *A47L 5/24*   (2006.01)
   *A47L 9/00*   (2006.01)
   *A47L 9/22*   (2006.01)
   *A47L 5/28*   (2006.01)
   *A47L 9/14*   (2006.01)

(52) U.S. Cl.
   CPC ............ *A47L 9/149* (2013.01); *A47L 9/1608* (2013.01); *A47L 9/1616* (2013.01); *A47L 9/1625* (2013.01); *A47L 9/1641* (2013.01); *A47L 9/22* (2013.01); *A47L 9/2842* (2013.01); *A47L 9/2857* (2013.01); *A47L 9/2884* (2013.01)

(58) Field of Classification Search
   CPC . A47L 9/00; A47L 9/1616; A47L 9/12; A47L 9/2857; A47L 9/149; A47L 9/1625; A47L 9/2884; A47L 9/16
   USPC .......................................................... 15/353
   See application file for complete search history.

(56) References Cited

U.S. PATENT DOCUMENTS

| | | | |
|---|---|---|---|
| 5,205,014 A | 4/1993 | Yoo | |
| 5,267,371 A | 12/1993 | Soler et al. | |
| 6,113,663 A | 9/2000 | Liu | |
| 6,546,592 B1 | 4/2003 | Cockburn et al. | |
| 6,782,585 B1 | 8/2004 | Conrad et al. | |
| 8,146,201 B2 | 4/2012 | Conrad | |
| 8,308,832 B2 | 11/2012 | Yoo | |
| 8,486,170 B2 | 7/2013 | Conrad et al. | |
| 8,925,145 B2 | 1/2015 | Wilson | |
| 9,005,325 B2 | 4/2015 | Smith | |
| 9,089,248 B2 | 7/2015 | Yoo | |
| 9,655,489 B2 | 5/2017 | Ha et al. | |
| 9,757,001 B2 | 9/2017 | Hwang et al. | |
| 9,826,868 B2 | 11/2017 | Conrad | |
| 2001/0027585 A1 | 10/2001 | Lee | |
| 2002/0189048 A1 | 12/2002 | Maruyama et al. | |
| 2003/0037403 A1 | 2/2003 | Lang et al. | |
| 2004/0163201 A1 | 8/2004 | Murphy | |
| 2005/0081321 A1 | 4/2005 | Milligan et al. | |
| 2006/0254226 A1 | 11/2006 | Jeon | |
| 2007/0144116 A1 | 6/2007 | Hong et al. | |
| 2009/0245958 A1 | 10/2009 | Lau et al. | |
| 2010/0192314 A1 | 8/2010 | Otsuka et al. | |
| 2010/0209271 A1 | 8/2010 | Yoo | |
| 2010/0251507 A1 | 10/2010 | Conrad et al. | |
| 2013/0091655 A1 | 4/2013 | Smith | |
| 2013/0091661 A1 | 4/2013 | Smith | |
| 2013/0091813 A1 | 4/2013 | Smith | |
| 2013/0091814 A1 | 4/2013 | Smith | |
| 2013/0192020 A1 | 8/2013 | Kang | |
| 2013/0205538 A1* | 8/2013 | Thompson ................ A47L 5/24 15/344 |
| 2013/0207615 A1 | 8/2013 | Sunderland et al. | |
| 2014/0020205 A1 | 1/2014 | Makarov | |
| 2014/0137363 A1 | 5/2014 | Wilson | |
| 2014/0325789 A1 | 11/2014 | Hill et al. | |
| 2014/0366495 A1 | 12/2014 | Stickney et al. | |
| 2015/0093973 A1 | 4/2015 | Sergyeyenko et al. | |
| 2015/0143659 A1 | 5/2015 | Pilch | |
| 2015/0320284 A1 | 11/2015 | Ha et al. | |
| 2016/0287043 A1 | 10/2016 | Ha et al. | |
| 2017/0280950 A1 | 10/2017 | Nam et al. | |
| 2017/0280951 A1 | 10/2017 | Nam et al. | |
| 2017/0280952 A1 | 10/2017 | Nam et al. | |
| 2017/0296007 A1 | 10/2017 | Warren | |
| 2017/0332860 A1 | 11/2017 | Nam et al. | |
| 2018/0333022 A1 | 11/2018 | Nam et al. | |
| 2018/0333023 A1 | 11/2018 | Nam et al. | |
| 2018/0333024 A1 | 11/2018 | Nam et al. | |
| 2018/0333026 A1 | 11/2018 | Nam et al. | |
| 2018/0333029 A1 | 11/2018 | Nam et al. | |
| 2018/0333030 A1 | 11/2018 | Nam et al. | |
| 2018/0333031 A1 | 11/2018 | Nam et al. | |
| 2018/0333032 A1 | 11/2018 | Nam et al. | |
| 2018/0333033 A1 | 11/2018 | Nam et al. | |

FOREIGN PATENT DOCUMENTS

| | | |
|---|---|---|
| CN | 101508105 A | 8/2009 |
| CN | 102452069 A | 5/2012 |
| CN | 103784081 A | 5/2014 |
| CN | 104172986 | 12/2014 |
| CN | 104822301 A | 8/2015 |
| CN | 204654807 U | 9/2015 |
| CN | 303387623 S | 9/2015 |
| CN | 207384196 U | 5/2018 |
| CN | 207384197 U | 5/2018 |
| CN | 207384198 U | 5/2018 |
| EP | 0557096 | 8/1993 |
| EP | 0650690 | 5/1995 |
| EP | 1803381 | 7/2007 |
| EP | 1955630 A2 | 8/2008 |
| EP | 2581017 A1 | 4/2013 |
| EP | 2581018 | 4/2013 |
| GB | 2475312 A | 5/2011 |
| JP | S4842757 | 12/1973 |
| JP | S5214775 | 2/1977 |
| JP | H1156692 | 3/1999 |
| JP | H11099097 | 4/1999 |
| JP | 3933855 | 6/2007 |
| JP | 201082167 | 4/2010 |
| JP | 2011143209 | 7/2011 |
| JP | 2012-120582 A | 6/2012 |
| JP | 2013000137 | 1/2013 |
| JP | 2013-106842 A | 6/2013 |
| JP | 2013106842 | 6/2013 |
| JP | 2014176567 | 9/2014 |
| JP | 2014176567 A | 9/2014 |
| JP | 2015034514 A | 2/2015 |
| JP | 2015119878 | 7/2015 |
| JP | 2016021997 | 2/2016 |
| KR | 20-0291206 Y1 | 10/2002 |
| KR | 200291206 | 10/2002 |
| KR | 20030088639 | 11/2003 |
| KR | 1020040040092 | 5/2004 |
| KR | 100474807 | 2/2005 |
| KR | 100555862 | 3/2006 |
| KR | 1020060074617 | 7/2006 |
| KR | 100640830 | 11/2006 |
| KR | 100671891 | 1/2007 |
| KR | 10-1127088 B | 4/2008 |
| KR | 10-1262385 B | 8/2008 |
| KR | 10-0640830 B1 | 11/2008 |
| KR | 1127088 | 4/2009 |
| KR | 10-1606890 B1 | 8/2010 |
| KR | 1020110066782 | 6/2011 |
| KR | 1020110122699 | 11/2011 |
| KR | 1020110132193 | 12/2011 |
| KR | 101262385 | 5/2013 |
| KR | 10-2014-0127305 A | 11/2014 |
| KR | 1020140127305 | 11/2014 |
| KR | 10-2015-0082575 A | 7/2015 |
| KR | 101539020 | 7/2015 |
| KR | 1020150082575 | 7/2015 |
| KR | 10-2015-0128425 A | 11/2015 |
| KR | 10-2015-0133815 A | 11/2015 |
| KR | 1020150128425 | 11/2015 |
| KR | 1020150133815 | 11/2015 |
| KR | 10-2016-0034041 A | 3/2016 |
| KR | 20160023134 | 3/2016 |
| KR | 1020160034041 | 3/2016 |
| WO | WO2013077122 | 5/2013 |
| WO | WO 2015/068817 A1 | 5/2015 |
| WO | WO 2016/054538 A1 | 4/2016 |

(56) References Cited

FOREIGN PATENT DOCUMENTS

WO     WO 2017/150861 A1     9/2017
WO     WO2017181484     10/2017

OTHER PUBLICATIONS

International Search Report in International Application No. PCT/K.R2017/003588, dated Jun. 29, 2017, 3 pages (with partial English translation).
Office Action in Australian Patent No. 2018100966, dated Sep. 14, 2018, 5 pages.
Office Action in Australian Patent No. 2018100968, dated Sep. 7, 2018, 5 pages.
Office Action in Australian Patent No. 2018100969, dated Sep. 7, 2018, 5 pages.
Office Action in Australian Patent No. 2018100970, dated Sep. 13, 2018, 5 pages.
Office Action in Australian Patent No. 2018100967, dated Sep. 7, 2018, 6 pages.
Office Action in Australian Patent No. 2018100971, dated Sep. 7, 2018, 5 pages.
Office Action in Australian Patent No. 2018100972, dated Sep. 13, 2018, 5 pages.
Office Action in Australian Patent No. 2018100947, dated Sep. 14, 2018, 5 pages.
Office Action in Australian Patent No. 2018100950, dated Sep. 14, 2018, 5 pages.
Office Action in Australian Patent No. 2018100953, dated Sep. 14, 2018, 5 pages.
Office Action in Australian Patent No. 2018100945, dated Sep. 17, 2018, 6 pages.
Office Action in Australian Patent No. 2018100954, dated Sep. 17, 2018, 6 pages.
Office Action in Australian Patent No. 2018100948, dated Oct. 17, 2018, 5 pages.
Office Action in Australian Patent No. 2018100949, dated Oct. 17, 2018, 5 pages.
Office Action in U.S. Appl. No. 15/475,476, dated Jan. 14, 2019, 9 pages.
Office Action in U.S. Appl. No. 16/050,852, dated Jan. 11, 2019, 28 pages.
Office Action in U.S. Appl. No. 16/050,883, dated Jan. 4, 2019, 16 pages.
Office Action in U.S. Appl. No. 16/051,072, dated Dec. 27, 2018, 16 pages.
Office Action in U.S. Appl. No. 16/051,227, dated Jan. 14, 2019, 14 pages.
Office Action in U.S. Appl. No. 16/050,956, dated Dec. 28, 2018, 20 pages.
Office Action in U.S. Appl. No. 16/050,945, dated Dec. 28, 2018, 22 pages.
United States Office Action in U.S. Appl. No. 15/475,460, dated Apr. 23, 2019, 26 pages.
United States Office Action in U.S. Appl. No. 15/475,550, dated May 3, 2019, 26 pages.
Russian Office Action in Russian Application No. 2018138167/12(063476), dated Apr. 19, 2019, 8 pages.
Extended European Search Report in European Application No. 17775923.0, dated Jul. 31, 2019, 7 pages.
Extended European Search Report in European Application No. 17775919.8, dated Oct. 17, 2019, 9 pages.

\* cited by examiner

CLEANER

CROSS-REFERENCE TO RELATED APPLICATIONS

This application is a continuation of U.S. application Ser. No. 15/475,476, filed on Mar. 31, 2017, which claims priority under 35 U.S.C. § 119 to Korean Patent Application No. 10-2016-0039814, filed in Korea on Mar. 31, 2016, and Korean Patent Application No. 10-2016-0070220, filed in Korea on Jun. 7, 2016, whose entire disclosure is hereby incorporated by reference.

BACKGROUND

The present disclosure relates to a cleaner.

Cleaners may be classified into a manual cleaner that a user moves in person for cleaning and an automatic cleaner that automatically moves for cleaning.

Manual cleaners may fall into, depending on the types, a canister cleaner, an upright cleaner, a handy cleaner, and a stick cleaner.

Meanwhile, in the related art, a handheld vacuum cleaner has been disclosed in Korean Patent No. 10-1127088 (registered on 8 Mar. 2012).

The handheld vacuum cleaner includes a suction pipe, an airflow generator, a cyclone, a power supply, and a handle.

The cyclone is disposed between the handle and the suction pipe, the airflow generator is disposed right over the handle, and the power supply is disposed right under the handle. Accordingly, the airflow generator and the power supply are disposed behind the cyclone.

The airflow generator and the power supply are relatively heavy parts of the components.

According to this document, since the relatively heavy airflow generator and power supply are disposed right over and under the handle, respectively, the center of gravity concentrates on the handle in the entire handheld vacuum cleaner, so it is inconvenient for a user to use the handheld vacuum cleaner and the user's wrist may be injured.

Further, according to the document, since the airflow generator is disposed behind the cyclone, the channel for guiding air from the cyclone to the airflow generator is necessarily long and the air discharged from the cyclone is sent to the airflow generator with the flow direction changed, which causes a large flow loss.

Further, according to the document, since the airflow generator is disposed right over the handle, the air discharged from the airflow generator directly touches the hand holding the handle.

SUMMARY

The present disclosure provides a cleaner that users can more conveniently use by distributing the overall weight.

The present disclosure provides a cleaner in which the length of a passage from a dust separation unit to a suction motor is minimized.

The present disclosure provides a cleaner that does not discharge air that has passed through a suction motor to a user.

A cleaner includes: a suction unit; a suction motor that generates suction force for sucking air through the suction unit and includes a rotary impeller; a dust separation unit that includes one or more cyclone units generating cyclonic flow to separate dust from air flowing inside through the suction unit; a dust container that stores dust separated by the dust separation unit and is disposed under the suction motor; a battery disposed behind the dust container to supply power to the suction motor; and a handle disposed behind the suction motor, wherein a rotational axis of the impeller and an axis of the cyclonic flow vertically extend and an extension line from the rotational axis of the impeller passes through the one or more cyclone units.

A cleaner includes: a suction unit; a suction motor that generates suction force for sucking air through the suction unit and includes a rotary impeller; a dust separation unit that includes one or more cyclone units generating cyclonic flow to separate dust from air flowing inside through the suction unit; a dust container that stores dust separated by the dust separation unit; a battery that supplies power to the suction motor; a handle disposed behind the suction motor; and a discharge cover that has air exits formed through the top thereof to discharge air that has passed through the suction motor, wherein an axis of the cyclonic flow passes through the discharge cover.

A cleaner includes: a suction unit that has a longitudinal axis; a suction motor that generates suction force for sucking air through the suction unit; a dust separation unit disposed to vertically overlap the suction motor in a state in which the longitudinal axis of the suction unit horizontally is positioned, and separates dust from air flowing inside through the suction unit; a dust container that has includes a dust collection body for storing dust separated from the dust separation unit and a body cover for opening and closing the dust collection body; and air exits for discharging air that has passed through the suction motor, wherein in a state in which the longitudinal axis of the suction unit is horizontally positioned, the longitudinal axis of the suction unit is positioned over the body cover and the direction in which air is sucked through the suction unit crosses the direction in which air is discharged through the air exits.

A cleaner includes: a suction unit; a suction motor that generates suction force for sucking air through the suction unit; a dust separation unit that separates dust from air flowing inside through the suction unit; a dust container that stores dust separated by the dust separation unit; a battery that supplies power to the suction motor; a handle disposed behind the suction motor; and air exits that are disposed over the suction motor to discharge air that has passed through the suction motor.

The suction motor vertically overlaps the dust separation unit.

The suction motor includes a rotary impeller and a rotational axis of the impeller vertically extends and vertically overlaps the dust separation unit and the dust container.

The suction motor includes a rotary impeller and the rotational axis of the impeller vertically extends, and an extension line from the rotational axis passes through the dust separation unit and the dust container.

The dust separation unit has one or more cyclone unit that generates cyclonic flow, and the rotational axis of the impeller and an axis of at least one cyclonic flow are positioned on the same line.

The cleaner further includes: a motor housing that receives the suction motor; and a discharge cover that is at least partially positioned over the motor housing and has the air exits.

The discharge cover includes a flow guide for discharging air discharged through the air exits at an angle from a vertical line.

The suction motor includes a rotary impeller, wherein an axis of the impeller vertically extends, and a barrier for blocking air discharged through the air exits is disposed in at least some area between the rotational axis of the impeller and the handle.

The cleaner further includes: a pre-filter that filters air discharged from the dust separation unit before the air flows into the suction motor; and an air guide that surrounds the suction motor in the motor housing and guides the air discharged from the dust separation unit to the suction motor.

The air discharged from the dust separation unit flows upward through the pre-filter, the air that has passed through the pre-filter flows back downward through the suction motor, and the air that has passed through the suction motor flows upward again and is discharged outside through the air exits.

Air discharged from the dust separation unit flows upward through the suction motor and is then discharged to the outside through the air exits.

DETAILED DESCRIPTION OF THE EMBODIMENTS

Figure 1:
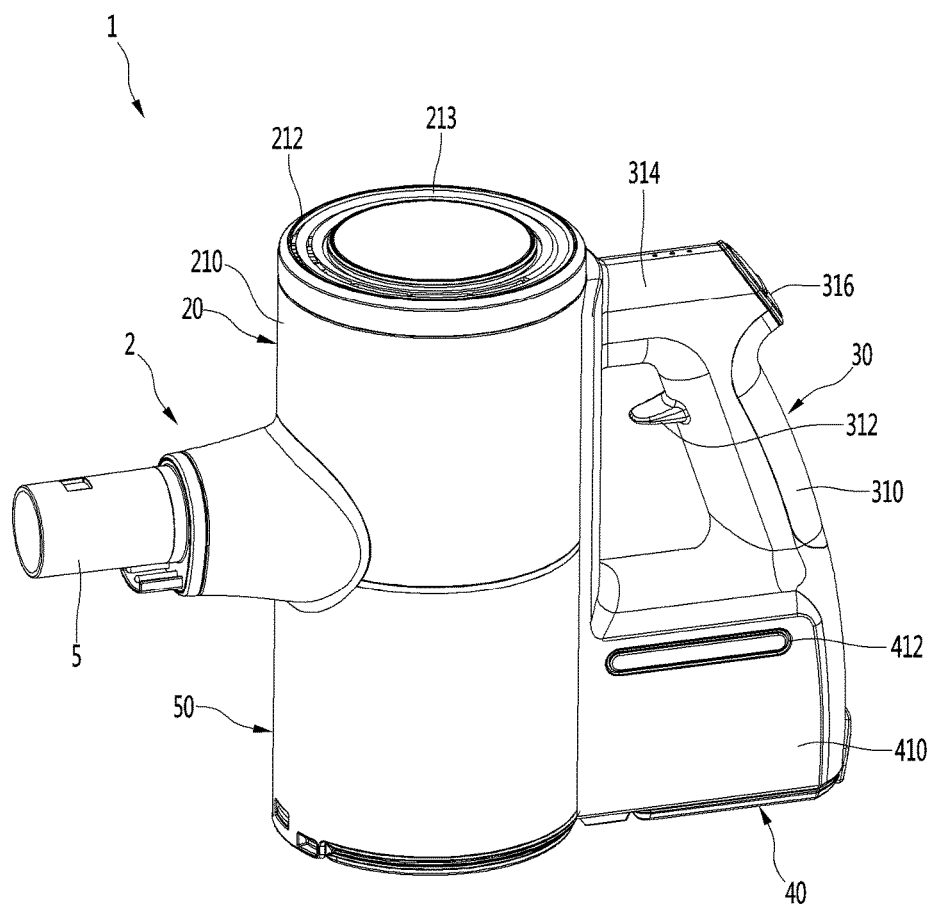
FIG. 1 is a perspective view of a cleaner according to an embodiment of the present invention.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
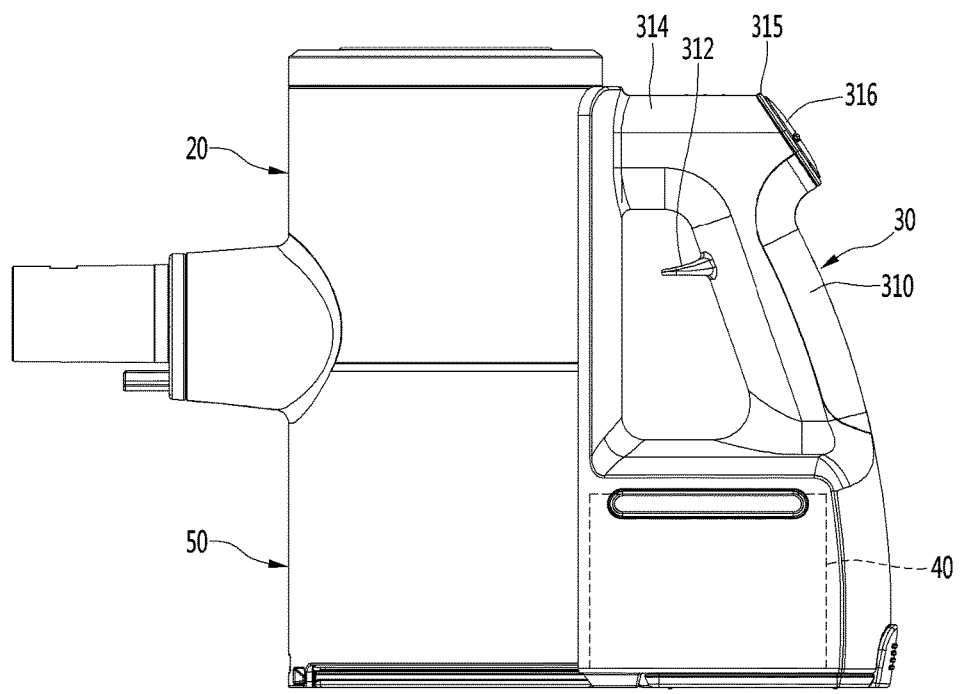
FIG. 2 is a side view of the cleaner according to an embodiment of the present invention.
Figure 3:
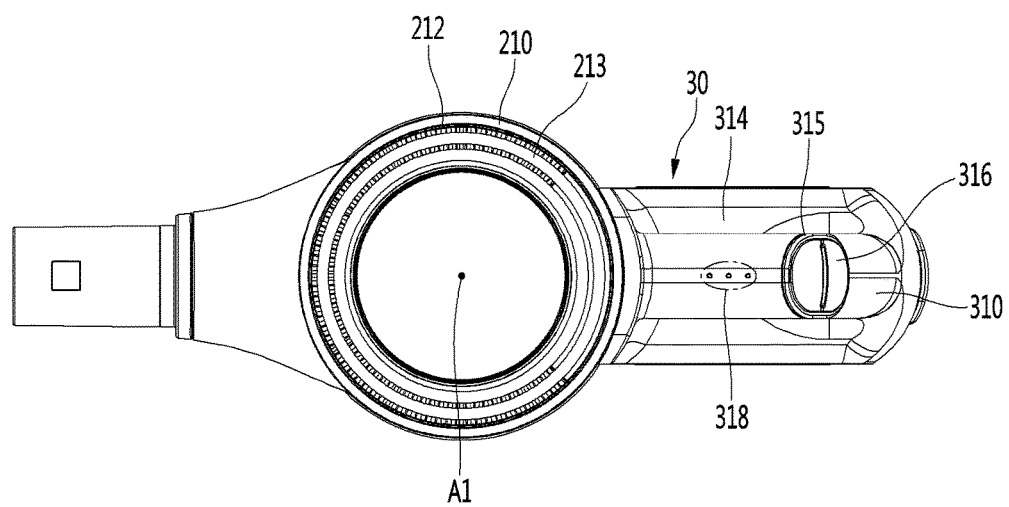
FIG. 3 is a plan view of the cleaner according to an embodiment of the present invention.

FIG. 1 is a perspective view of a cleaner according to an embodiment of the present invention, FIG. 2 is a side view of the cleaner according to an embodiment of the present invention, FIG. 3 is a plan view of the cleaner according to an embodiment of the present invention.

Figure 4:
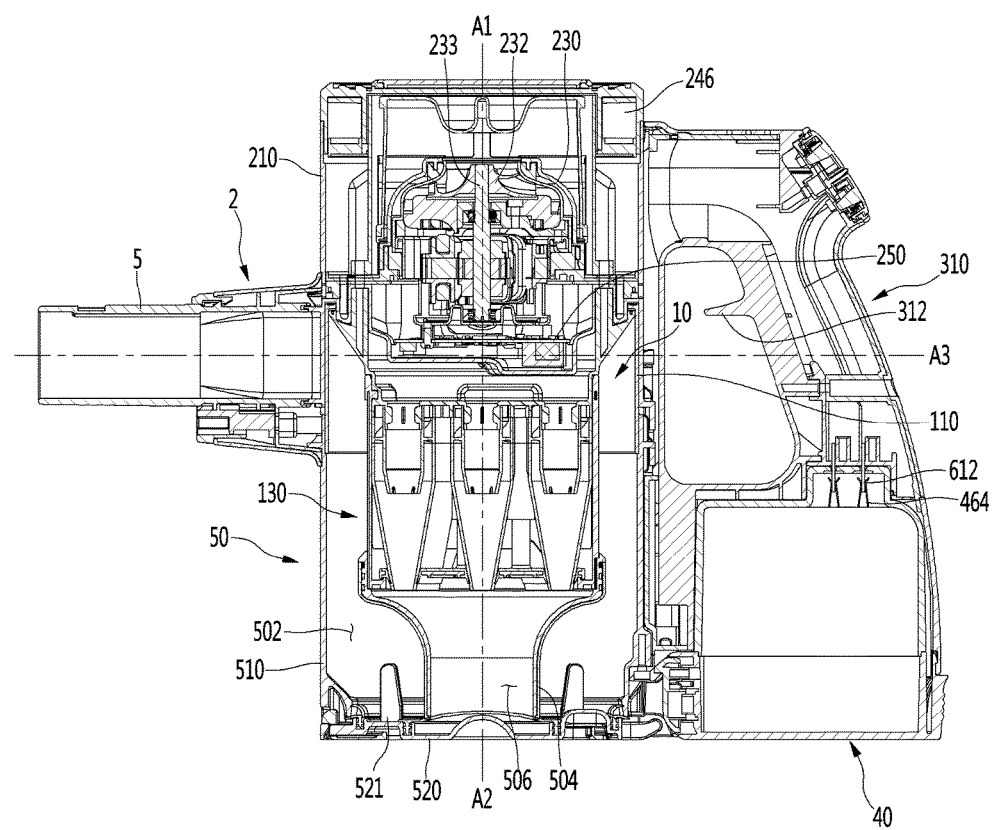
FIG. 4 is a cross-sectional view of the cleaner according to an embodiment of the present invention.
Figure 5:
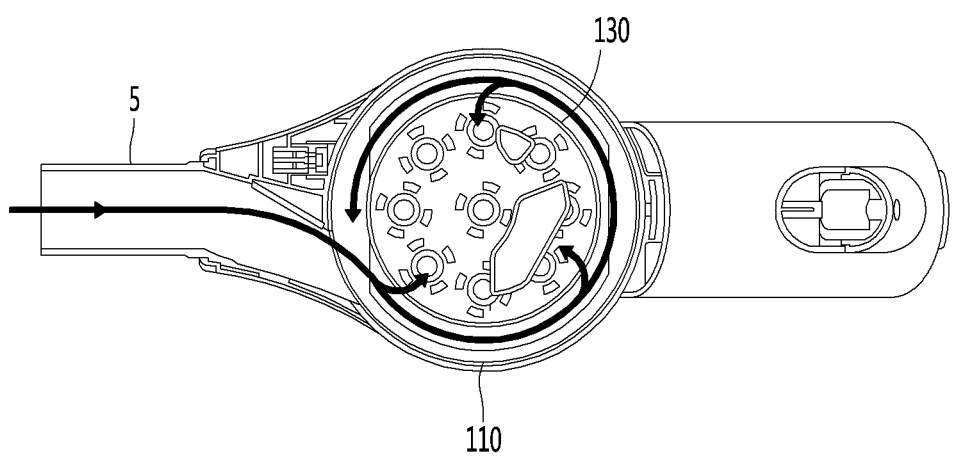
FIG. 5 is a horizontal cross-sectional view of the cleaner according to an embodiment of the present invention.

FIG. 4 is a vertical cross-sectional view of the cleaner according to an embodiment of the present invention and FIG. 5 is a horizontal cross-sectional view of the cleaner according to an embodiment of the present invention.

Referring to FIGS. 1 to 5, a cleaner 1 according to an embodiment of the present invention may include a main body 2.

The main body 2 may include a suction unit 5 that sucks air containing dust.

The main body 2 may further include a dust separation unit 10 for separating dust sucked inside through the suction unit 5 and a dust container 50 for storing dust separated by the dust separation unit 10.

The dust separation unit 10 may include a first cyclone unit 110 that can separate dust, for example, using cyclonic flow.

The first cyclonic unit section 110 may communicate with the suction unit 5.

The air and dust sucked through the suction unit 5 helically flow along the inner side of the first cyclone unit 110.

The axis A2 of the cyclonic flow in the first cyclone unit 110 may vertically extend.

The dust separation unit 10 may further include a second cyclone unit 130 that secondarily separates dust from the air discharged out of the first cyclone unit 110. The second cyclone unit 130 may be disposed inside the first cyclone unit 110 to minimize the size of the dust separation unit 10. The second cyclone unit 130 may include a plurality of cyclone bodies arranged in a raw. Further the axis of the cyclonic flow in the cyclone bodies vertically extends and may pass through a suction motor 230.

As another example, the dust separation unit may include one cyclone unit, in which the axis A2 of the cyclonic flow may also vertically extend.

The dust container 50 may include a cylindrical dust collection body 510 and a body cover 502 rotatably coupled to the bottom of the dust collection body 510.

In this embodiment, the upper portion of the dust collection body 510 may function as the first cyclone unit 110 without a separate first cyclone unit 110.

At least a portion of the second cyclone unit 130 may be positioned inside the dust container 50.

A dust storage guide 504 that guides the dust separated by the second cyclone unit 130 to be stored may be disposed in the dust collecting body 510. The dust storage guide 504 may be coupled to the bottom of the second cyclone unit 130 in contact with the top of the body cover 520.

The dust storage guide 504 may divide the internal space of the dust collecting body 10 into a first dust storage part 502 where the dust separated by the first cyclone unit 110 is stored and a second dust storage part 506 where the dust separated by the second cyclone unit 130 is stored.

The internal space of the dust storage guide 504 is the second dust storage part 506 and the space between the dust storage guide 504 and the dust collecting body 10 is the first dust storage part 502.

The body cover 520 can open/close both of the first dust storage part 502 and the second dust storage part 506.

The body cover 520 may include a rib 521 for preventing the dust in the first dust storage part 502 from being rotated by cyclonic flow. The rib 521 may extend upward from the body cover 520. The rib 521 may be positioned close to the inner side of the dust collection body 510 when the body cover 520 covers the first and second dust storage parts 502 and 506.

The cyclonic flow is generated along the inner side of the dust collection body 510 in the first dust storage part 502, so when the rib 521 is positioned close to the inner side of the dust collection body 510, the cyclonic flow is blocked by the rib 521, whereby it is possible to prevent the dust from rotating in the first dust storage part 502.

The main body 2 may further include a suction force generation unit 20 for generating suction force. The suction force generation unit 20 may include a motor housing 210 and a suction motor 230 disposed in the motor housing 210.

At least a portion of the suction motor 230 may be disposed over the dust separation unit 10. Accordingly, the suction motor 230 is disposed over the dust container 50.

That is, the dust separation unit 10 may be arranged to vertically overlap the suction motor 230, in a state in which the longitudinal axis of the suction unit 5 is positioned in the horizontal direction. For example, a portion of the suction motor 230 may be positioned in the first cyclone unit 110.

The bottom of the suction motor 230 may be connected to the top of the second cyclone unit 130. Accordingly, the axis A2 of the cyclonic flow in the dust separation unit 10 may pass through the suction motor 230. The suction motor 230 is positioned higher than the longitudinal axis A3 of the suction unit 5.

When the suction motor 230 is disposed over the second cyclone unit 130, the air discharged from the second cyclone unit 130 can flow directly to the suction motor 230, so the channel between the dust separation unit 10 and the suction motor 230 can be minimized.

The suction motor 230 may include a rotary impeller 232. The impeller 232 may be fitted on a shaft 233. The shaft 233 is vertically disposed and may be at least partially positioned in the dust separation unit 10. In this case, when the dust container 50 and the suction motor 230 are vertically arranged, the height of the cleaner 1 can be reduced. An extension line from a rotational axis A1 of the impeller 232 (which may be the axis of the suction motor) may pass the dust separation unit 10 and the dust container 50.

The rotational axis A1 of the impeller 232 and the axis A2 of the cyclonic flow in the first cyclone unit 110 may be on the same line.

According to the present invention, there is the advantage that the path through which the air discharged from the dust separation unit, that is, the air discharged upward from the second cyclone unit 130 flows to the suction motor 230 can be reduced and a change in direction of air can be decreased, so a loss of airflow can be reduced.

As the loss of airflow is reduced, suction force can be increased and the lifetime of the battery 40 for supplying power to the suction motor 230 can be increased.

A PCB 250 for controlling the suction motor 230 may be disposed between the suction motor 230 and the second cyclone unit 130.

The cleaner 1 may further include a handle 30 for a user to hold and a battery 40 for supplying power to the suction motor 230.

The handle 30 may be disposed behind the suction motor 20. Accordingly, the axis of the suction motor 230 may be positioned between the suction unit 5 and the handle 30.

As for directions, with respect to the suction motor 230 in the cleaner 1, the direction in which the suction unit 5 is positioned is the front direction and the direction in which the handle 30 is positioned is the rear direction.

The battery 40 may be disposed under the handle 30. The battery 40 may be disposed behind the dust container 50.

Accordingly, the suction motor 230 and the battery 40 may be arranged not to vertically overlap each other and may be disposed at different heights.

According to the present invention, since the suction motor 230 that is heavy is disposed ahead of the handle 30 and the battery 40 that is heavy is disposed behind the handle 30, so weight can be uniformly distributed throughout the cleaner 1. It is possible to prevent injuries to the user's wrist when a user cleans with the handle 30 in his/her hand. That is, since the heavy components are distributed at the front and rear portions and at different heights in the cleaner 1, it is possible to prevent the center of gravity of the cleaner 1 from concentrating on any one side.

Since the battery 40 is disposed under the handle 30 and the suction motor 230 is disposed in front of the handle 30, there is no component over the handle 30. That is, the top of the handle 30 forms a portion of the external appearance of the top of the cleaner 1.

Accordingly, it is possible to prevent any component of the cleaner 1 from coming in contact with the user's arm while the user cleans with the handle 30 in his/her hand.

The handle 30 may include a first extension 310 extending vertically to be held by a user and a second extension 314 extending toward the suction motor 230 over the first extension 310. The second extension 314 may at least partially horizontally extend.

A stopper 312 for preventing a user's hand holding the first extension 310 from moving in the longitudinal direction of the first extension 310 (vertically in FIG. 2) may be formed on the first extension 310. The stopper 312 may extend toward the suction motor 230 from the first extension 310.

The stopper 312 is spaced apart from the second extension 314. Accordingly, a user is supposed to hold the first extension 310, with some of the fingers over the stopper 312 and the other fingers under the stopper 312.

For example, the stopper 312 may be positioned between the index finger and the middle finger.

In the present invention, the longitudinal axis A3 of the suction unit 5 passes through the first extension 310. The stopper 312 is positioned higher than the longitudinal axis A3 of the suction unit 5.

According to this arrangement, when a user holds the first extension 310, the longitudinal axis A3 of the suction unit 5 may pass through the user's wrist.

When the longitudinal axis A3 of the suction unit 5 passes through the user's wrist and the user's arm is stretched, the longitudinal axis A3 of the suction unit 5 may be substantially aligned with the user's stretched arm. Accordingly, there is the advantage in this state that the user uses minimum force when pushing or pulling the cleaner 1 with the handle 30 in his/her hand.

The handle 310 may include an inclined surface 315 where an operation unit 316 is disposed. It is possible to input instructions to turn on/off the cleaner through the operation unit 316. The inclined surface 315 may be formed to face a user. For example, the operation unit 380 may be formed at the rear side of the second extension 314. The operation unit 316 may be disposed opposite to the stopper 312 with the handle 30 therebetween. The operation unit 316 on the inclined surface 315 is positioned higher than the stopper 312.

Accordingly, a user can easily operate the operation unit 390 with his/her thumb with the first extension 310 in his/her hand.

Further, since the operation unit 316 is positioned outside the first extension 310, it is possible to prevent the operation unit 316 from being unexpectedly operated when a user cleans with the first extension 310 in his/her hand.

A display unit 318 for showing operational states may be disposed on the second extension 314. The display unit 318 may be, for example, disposed on the top of the second extension 314. Accordingly, a user can easily check the display unit 314 on the top of the second extension 318 while cleaning.

The display unit 318, though not limited, may include a plurality of light emitting devices. The light emitting devices may be spaced apart from each other in the longitudinal direction of the second extension 314.

A battery housing 410 is disposed under the handle 30 and the battery 40 is received in the battery housing 410. That is, the battery housing 410 is disposed under the first extension 310.

The battery 40 may be detachably combined with the battery housing 60. For example, the battery 40 may be inserted into the battery housing 60 from under the battery housing 60.

A heat discharge hole 412 for discharging heat from the battery 40 to the outside may be formed through the battery housing 410.

The rear side of the battery housing 410 and the rear side of the first extension 310 may form a continuous surface. Accordingly, the battery housing 410 and the first extension 310 can be shown like a single unit.

Referring to FIG. 3, the cleaner 1 may further include a discharge cover 211 having air exits 212 for discharging the air that has passed through the suction motor 230.

A HEPA (High Efficiency Particulate Air) filter 246 for filtering air may be disposed in the discharge cover 211. The axis of the cyclonic flow may pass through the discharge cover 211.

The air exits 212, for example, may be arranged around the rotary shaft 233 of the impeller 232. The discharge cover 210 has a flow guide 213 so that the air to be discharged through the air exits 212 is discharged at an angle from the rotary shaft A1 of the impeller 232. The direction in which air is sucked through the suction unit 5 crosses the direction in which air is discharged through the air exits 212.

An air exit may not be formed at least in some area between the rotary shaft 233 of the impeller 232 and the handle 30 in FIG. 3 to prevent the air discharged from the air exits 212 from flowing to a user. That is, assuming that the cleaner is divided to the front and rear from the axis A2 of the cyclonic flow, some of the air exits 212 is positioned ahead of the axis A2 of the cyclonic flow.

As another example, referring to FIG. 3, a barrier for stopping air discharged from the air exits 212 may be disposed at least in some area between the rotary axis A1 of the impeller 232 and the handle 30.

Figure 6:
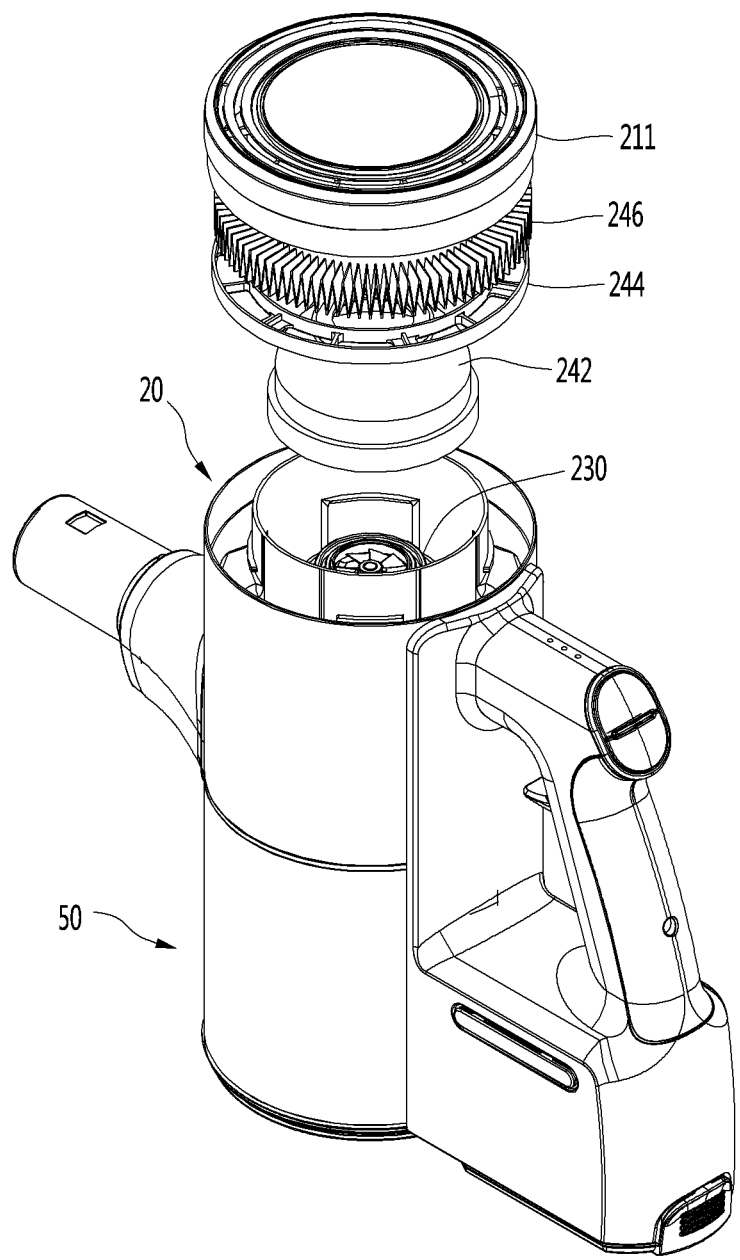
FIG. 6 is a view when a discharge cover and filters have been separated in the cleaner according to an embodiment of the present invention.
Figure 7:
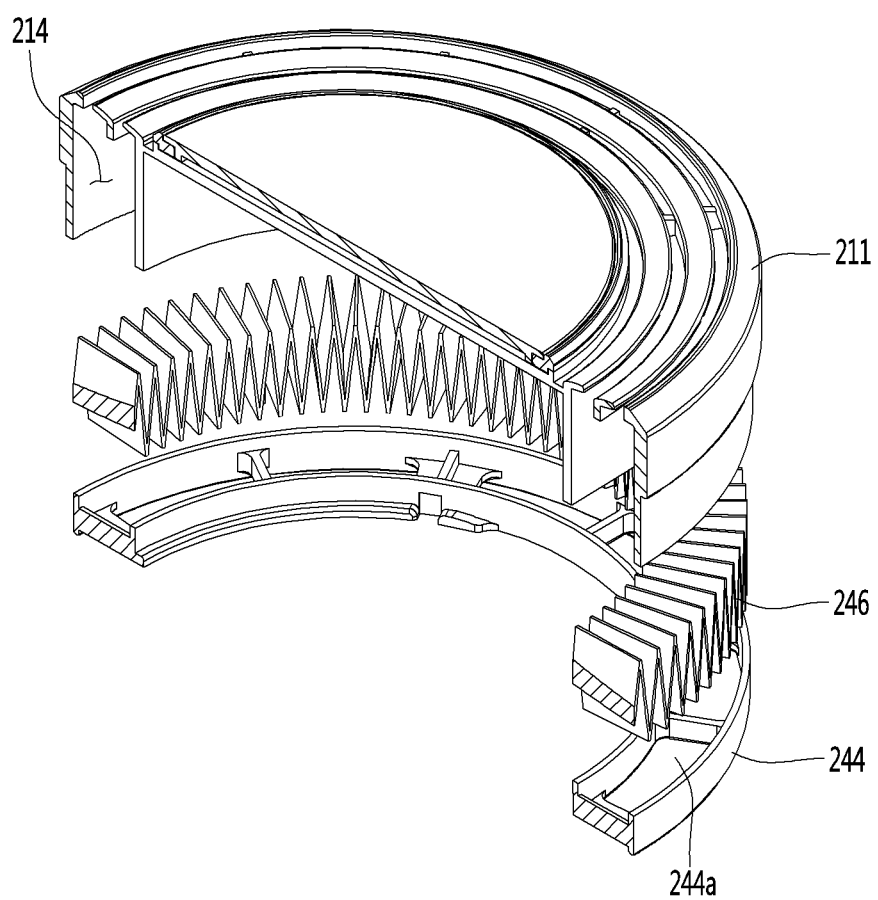
FIG. 7 is a view showing a structure for receiving a HEPA (High Efficiency Particulate Air) filter in the discharge cover.

FIG. 6 is a view when a discharge cover and filters have been separated in the cleaner according to an embodiment of the present invention is combined with the flow guide and FIG. 7 is a view showing a structure for receiving a HEPA (High Efficiency Particulate Air) filter in the discharge cover.

Referring to FIGS. 6 and 7, the cleaner 1 may further include a pre-filter 242 for filtering air flowing into the suction motor 230.

The pre-filter 242 may be disposed to surround a portion of the suction motor 230. The rotary shaft A1 of the impeller 232 may pass through the pre-filter 242.

The air that has passed through the pre-filter 242 flows to the impeller 232 inside the suction motor 230 and then passes through the suction motor 230. Further, the air passes through the HEPA filter 246 and then finally can be discharged outside through the air exits 212.

It should be noted that although the cleaner 1 includes the pre-filter 242 and the HEPA filter 246 in the present invention, the type and number of the filters are not limited. In this specification, the pre-filter 242 may be called a first filter and the HEPA filter 246 may be called a second filter.

The discharge cover 211 may include a receiving portion 214 for receiving the HEPA filter 246. The filter receiving portion 214 is open downward, so the HEPA filter 246 can be inserted into the receiving portion 214 from under the discharge cover 211.

Further, the air exits 212 of the discharge cover 211 face the HEPA filter 246.

When being inserted in the receiving portion 214, the HEPA filter 246 is covered by the filter cover 244. The filter cover 244 has one or more holes 244a for passing air. The filter cover 244 may be detachably coupled to the discharge cover 211.

The discharge cover 211 may be separably combined with the motor housing 210. Accordingly, it is possible to separate the discharge cover 211 from the motor housing 210 to clean the HEPA filter 246. It is possible to take the HEPA filter 246 out of the receiving portion 214 by separating the filter cover 244 from the discharge cover 211 separated from the motor housing 210.

In a state in which the discharge cover 211 is separated from the motor housing 210, the pre-filter 242 can be exposed to the outside. Accordingly, a user can clean the pre-filter 242 after separating the pre filter 242 exposed to the outside from the motor housing 210.

According to the present invention, a user can reach the HEPA filter 246 and the pre-filter 242 by separating the discharge cover 211 from the motor housing 210, he/she can easily separate and clean the filters 242 and 246.

Figure 8:
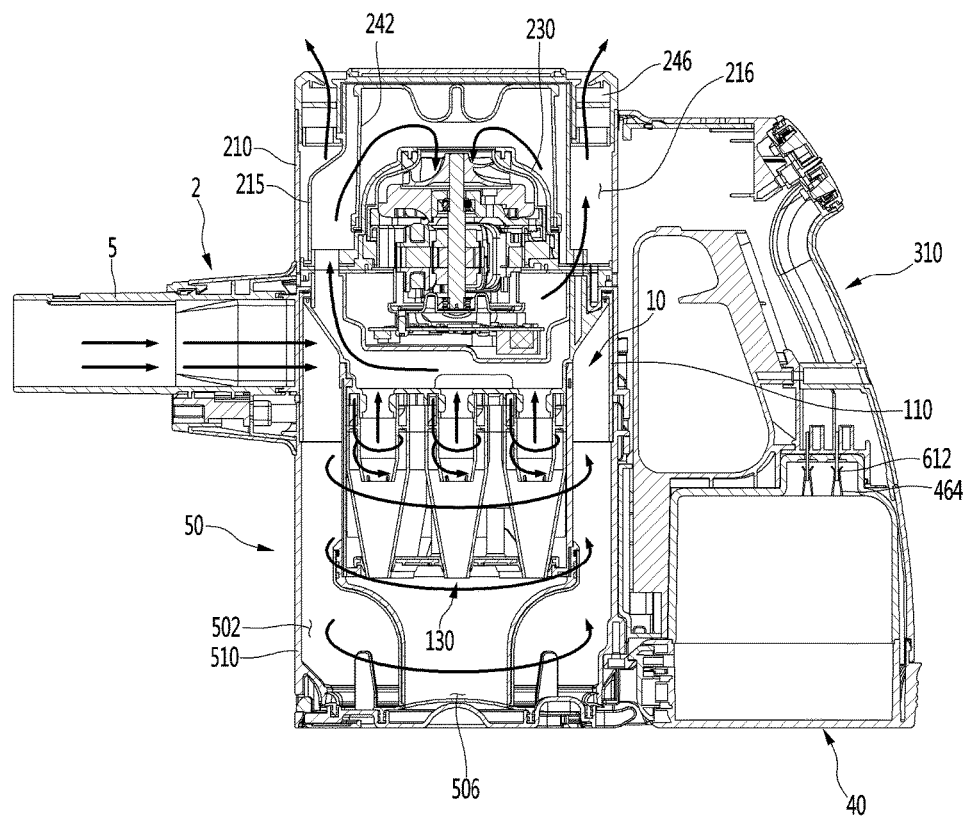
FIG. 8 is a view showing airflow in the cleaner according to an embodiment of the present invention.

FIG. 8 is a view showing airflow in the cleaner according to an embodiment of the present invention.

The airflow in the cleaner 1 is described with reference to FIG. 8.

Air and dust sucked through the suction unit 5 by the suction motor 230 are separated from each other while flowing along the inner side of the first cyclone unit 110.

The dust separated from the air drops into the first dust storage part 502. The air separated from the dust flows into the second cyclone unit 130. The air flowing in the second cyclone unit 130 is separated again from dust.

The dust separated from the air in the second cyclone unit 130 drops into the second dust storage part 506. On the other hand, the air separated from the dust in the second cyclone unit 130 is discharged upward to the suction motor 230 from the second cyclone unit 130.

An air guide 215 for guiding the air discharged from the second cyclone unit 130 to the pre-filter 242 may be disposed outside the suction motor 230. The air guide 215 surrounds the outer side of the suction motor 230 and may be at least partially spaced apart from the suction motor 230.

Accordingly, air flows upward along the air guide 215 outside the suction motor 230 and then passes through the pre filter 242. The air that has passed through the pre-filter 242 passes through the suction motor 230. The air is discharged to an exhaust channel 216 between the air guide 215 and the motor housing 210 after flowing in the suction motor 230 by the impeller 232.

The air discharged into the exhaust channel 216 passes through the HEPA filter 246 and is then discharged to the outside through the air exits 212 of the discharge cover 211.

Figure 9:
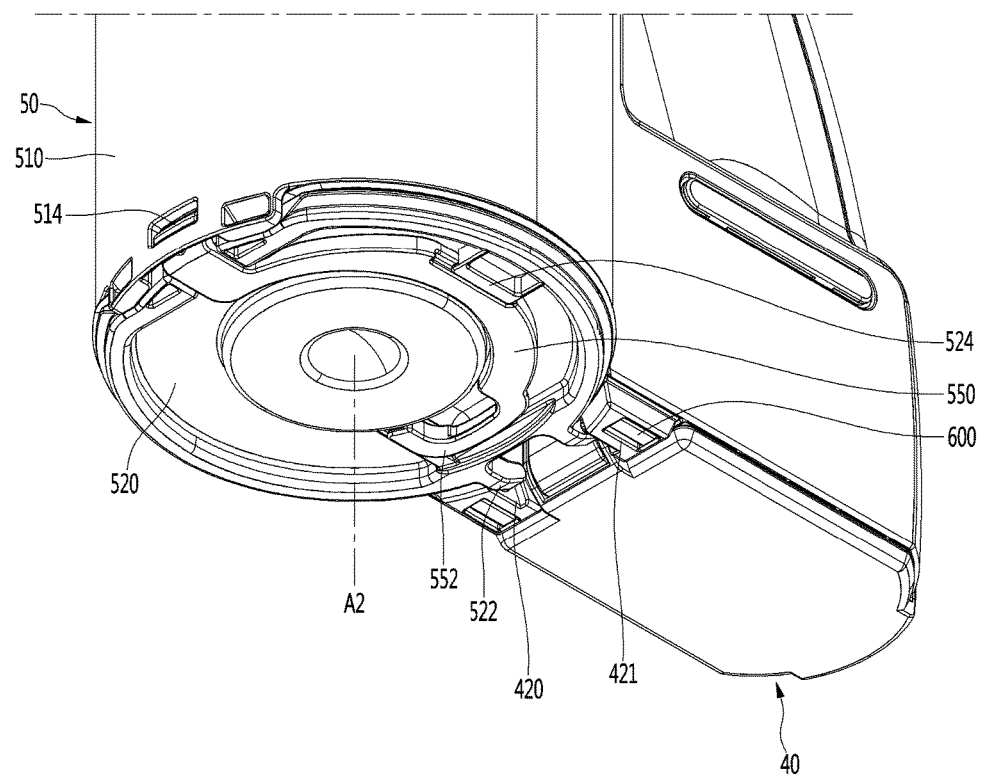
FIG. 9 is a view showing a lower structure of the cleaner according to an embodiment of the present invention.
Figure 10:
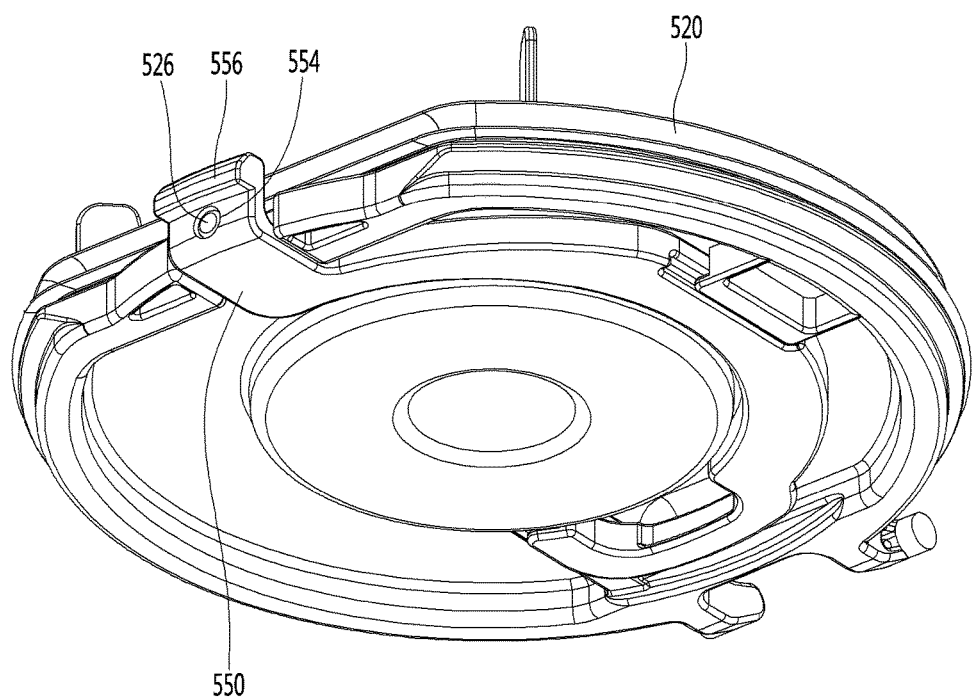
FIG. 10 is a perspective view of a body cover according to an embodiment of the present invention.
Figure 11:
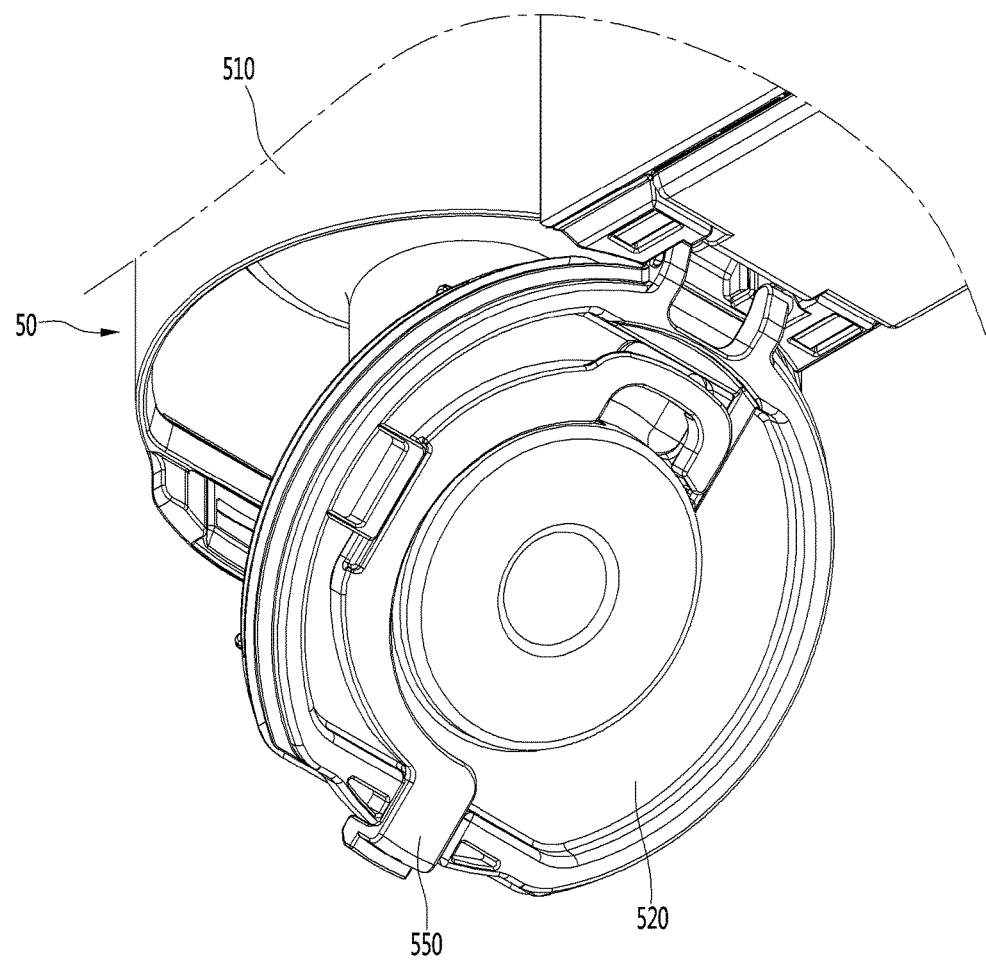
FIG. 11 is a view showing the body cover that has been rotated from the state in FIG. 9.

FIG. 9 is a view showing a lower structure of the cleaner according to an embodiment of the present invention, FIG. 10 is a perspective view of a body cover according to an embodiment of the present invention, and FIG. 11 is a view showing the body cover that has been rotated from the state in FIG. 9.

Referring to FIGS. 9 to 11, the body cover 520 can open/close the bottom of the dust collection body 510 by rotating.

The body cover 520 may include a hinge 522 for rotating. The hinge 522 may be coupled to the dust collection body 510 or to a separate hinge coupling portion 420 on the dust collection body 510. When the hinge coupling portion 420 is formed separately from the dust collection body 510, the hinge coupling portion 420 may be coupled to the dust collection body 510.

The hinge 522 of the body cover 520 may be positioned between the axis A2 of the cyclonic flow and the battery 40.

Accordingly, when the body cover 520 is rotated about the hinge 522, the body cover 520 is rotated toward a user, as in FIG. 11.

After the body cover 520 is rotated toward a user, the body cover 520 prevents dust from flying to the user when the dust in the dust collection body 510 drops.

The body cover 520 may include a coupling lever 550 that can be moved by a user and is coupled to the dust collection body 510. The coupling lever 550 may be coupled in parallel with the longitudinal axis A3 of the suction unit 5.

The body cover 520 may include a first guide 524 that can guide the coupling lever 550 and prevents the coupling lever 550 from separating downward. The first guide 524 extends downward from the body cover 520 and at least a portion of the first guide 524 is positioned under the coupling lever 550.

The body cover 520 may further include a second guide 526 that can guide the coupling lever 550 and prevents the coupling lever 550 from separating downward. The second guide 526 protrudes from a side of the body cover 520 and may pass through the coupling lever 550.

The second guide 526 may pass through the coupling lever 550 in parallel with the longitudinal axis A3 of the suction unit 5. A hole 556 for the second guide 554 may be formed in the coupling lever 550.

The coupling lever 552 may have a ring-shaped portion 552 for a user to easily operate the coupling lever 550 by putting a finger in it. The ring-shaped portion 552 may be positioned between the hinge 522 of the body cover 520 and the axis A2 of the cyclonic flow so that a user can easily reach the ring-shaped portion 552.

The coupling lever 550 includes a coupling hook 556 and the dust collection body 510 may include a hook slot 514 for locking the coupling hook 556.

The coupling hook 556 may be locked to the hook slot 514 inside the dust collection body 510. Though not shown in the figures, an elastic member that applies elasticity to the coupling lever 550 to maintain the coupling hook 556 locked in the hook slot 514 may be disposed between the body cover 520 and the coupling lever 550.

When a user pulls the ring-shaped portion 552 of the coupling lever 500 toward himself/herself, the coupling hook 556 is pulled out of the hook slot 514, so the body cover 520 can be rotated.

On the other hand, the hinge coupling portion 420 may include main body terminals 600 for charging the battery 40 in the battery housing 410. It is possible to bring charging stand terminals in contact with the main body terminals 600 by placing the cleaner 1 on a charging stand (not shown).

The main body terminals 600 are disposed on the bottom of the hinge coupling portion 420, but can be spaced apart from the floor when the cleaner 1 is placed on the floor. Accordingly, damage to the main body terminal 600 can be prevented.

Figure 12:
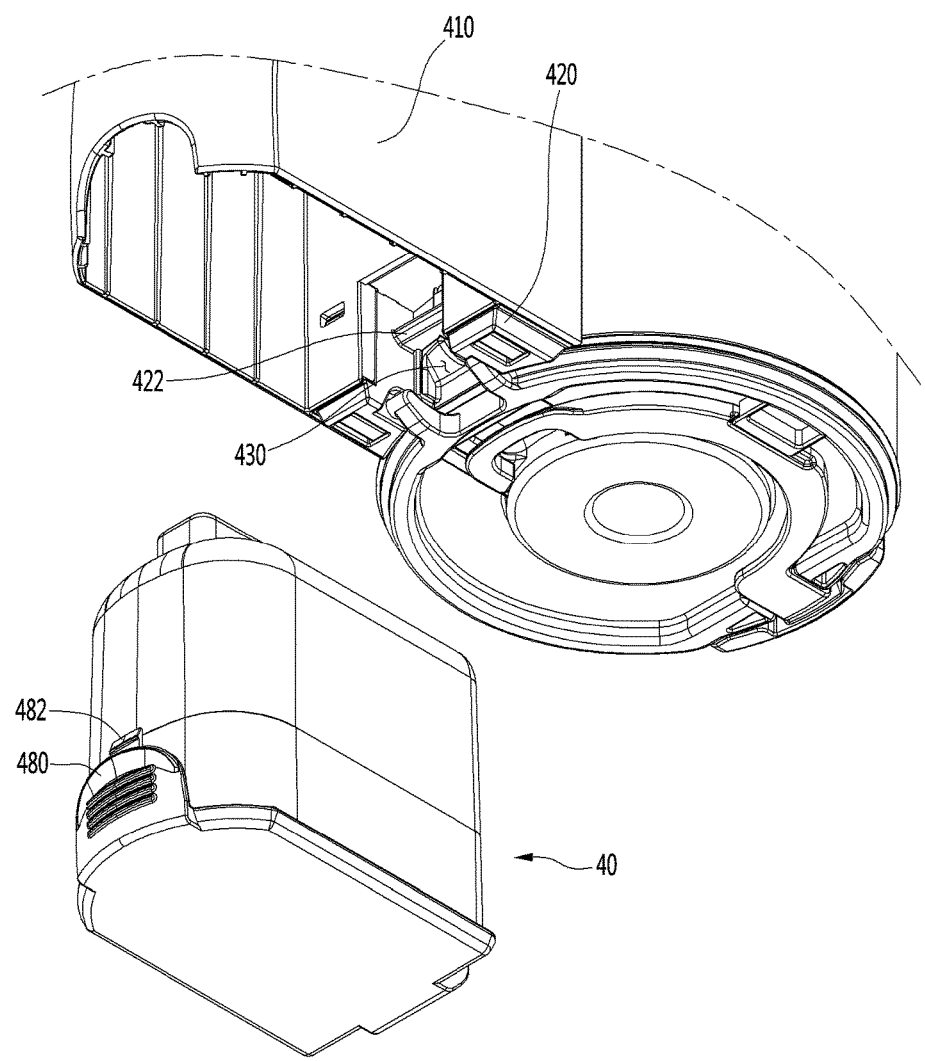
FIG. 12 is a view when a battery according to an embodiment of the present invention has been separated from a battery housing.
Figure 13:
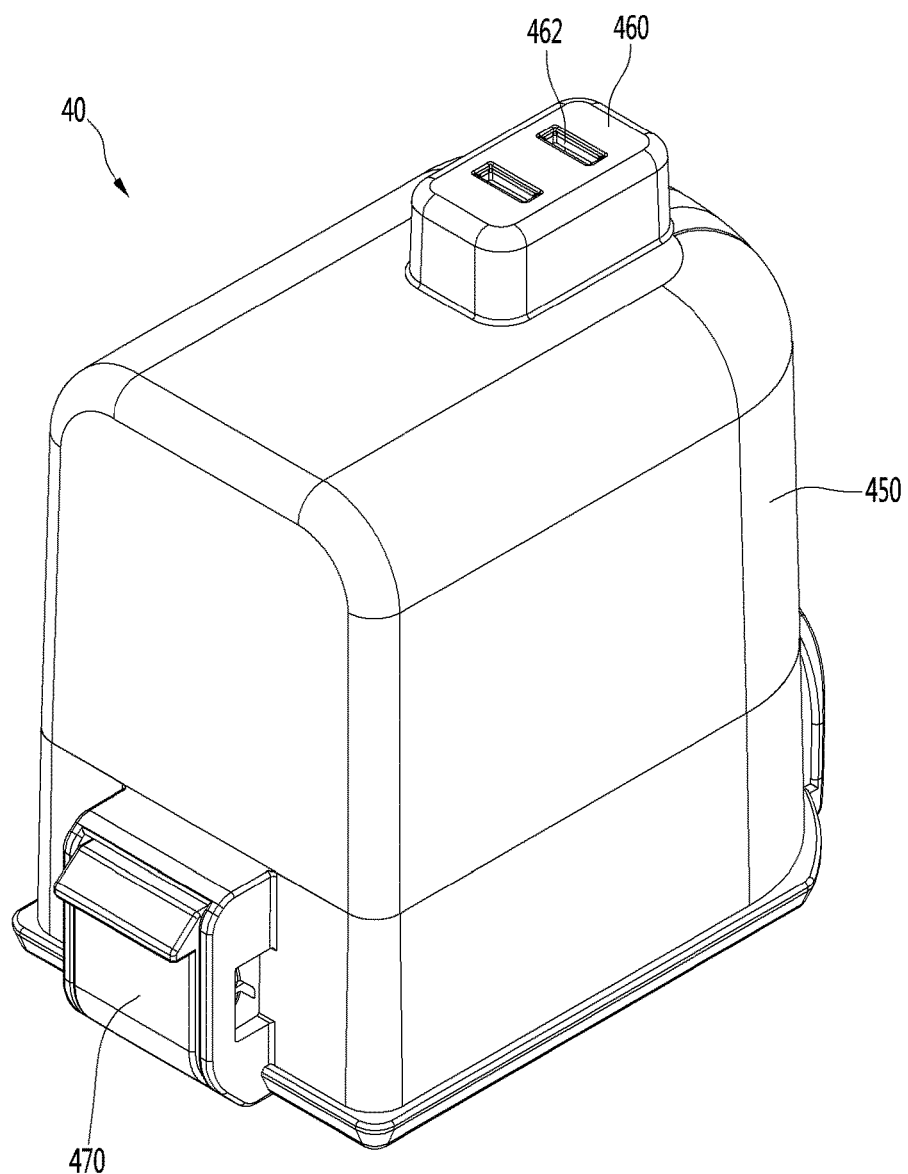
FIG. 13 is a perspective view of the battery according to an embodiment of the present invention.
Figure 14:
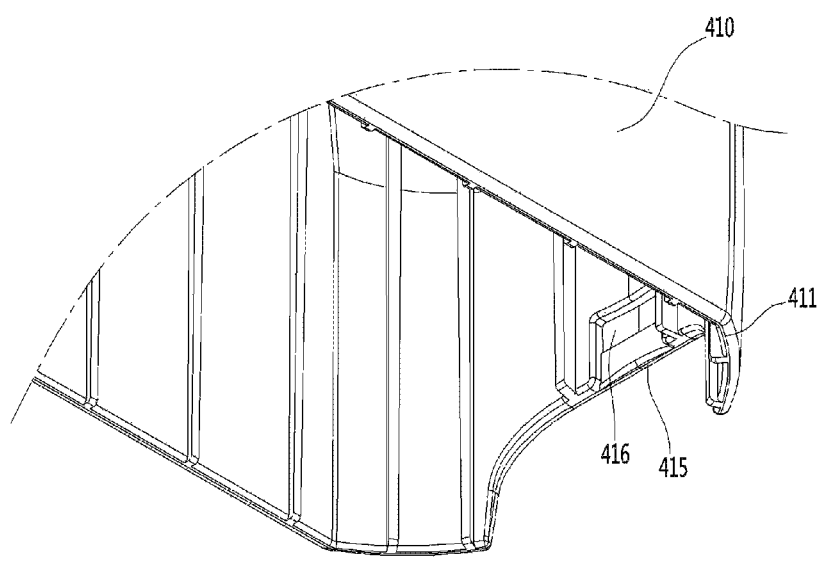
FIG. 14 is a view showing a coupling groove of a battery housing according to an embodiment of the present invention.

FIG. 12 is a view when a battery according to an embodiment of the present invention has been separated from a battery housing, FIG. 13 is a perspective view of the battery according to an embodiment of the present invention, and FIG. 14 is a view showing a coupling groove of a battery housing according to an embodiment of the present invention.

Referring to FIGS. 9, and 12 to 14, the battery may include battery cells (not shown) and a frame 450 protecting the battery cells.

A protrusion 460 is formed on the top of the frame 450 and terminals 462 may be disposed in the protrusion 460.

The battery 40 may include a plurality of coupling portions 470 and 480. The coupling portions 470 and 480 may include a first coupling portion 470 disposed on a first side of the frame 450 and a second coupling portion 480 disposed on a second side of the frame 450. The first coupling portion 470 and the second coupling portion 480, for example, may be positioned opposite to each other.

The first coupling portion 470 may be a hook rotatably coupled to the frame 450.

The first coupling portion 470, for example, may be coupled to the hinge coupling portion 420 when the battery 40 is inserted in the battery housing 410. Accordingly, the hinge coupling portions 420 may be called as battery coupling portions.

A locking rib 422 for locking a portion of the hinge coupling portion 470 may be formed on the hinge coupling portion 420.

As another example, the hinge coupling portion 420 may be integrally formed with the battery housing 410 or the locking rib 422 may be formed on the battery housing 410.

The second coupling portion 480 may be a hook that is integrally formed with the frame 450 and can be deformed by external force.

An opening 411 for inserting the battery 40 is formed at the bottom of the battery housing 410. An exposing opening 415 for exposing the second coupling portion 480 to the outside may be formed so that the second coupling portion 480 can be operated with the battery 40 in the battery housing 410.

A coupling groove 416 for coupling the second coupling portion 480 may be formed over the exposing opening 415 in the battery housing 410.

A space 530 for operating the first coupling portion 470 is defined between the dust container 50 and the first coupling portion 470 when the battery 40 is inserted in the battery housing 410.

Accordingly, a user can put a finger into the space 530 and unlock the locking rib 422 from the first coupling portion 470. Further, the user can unlock the second coupling portion 480 from the battery housing 410 by operating the second coupling portion 480 exposed to the outside of the battery housing 410.

According to the present invention, since the battery 40 can be separated from the battery housing 410, it is possible to place only the battery 40 on the charging stand to charge it.

Further, since the cleaner 1 includes the main body terminal 600, it is possible to charge the battery 4 by placing the cleaner 1 on the charging stand with the battery 40 in the battery housing 410.

Figure 15:
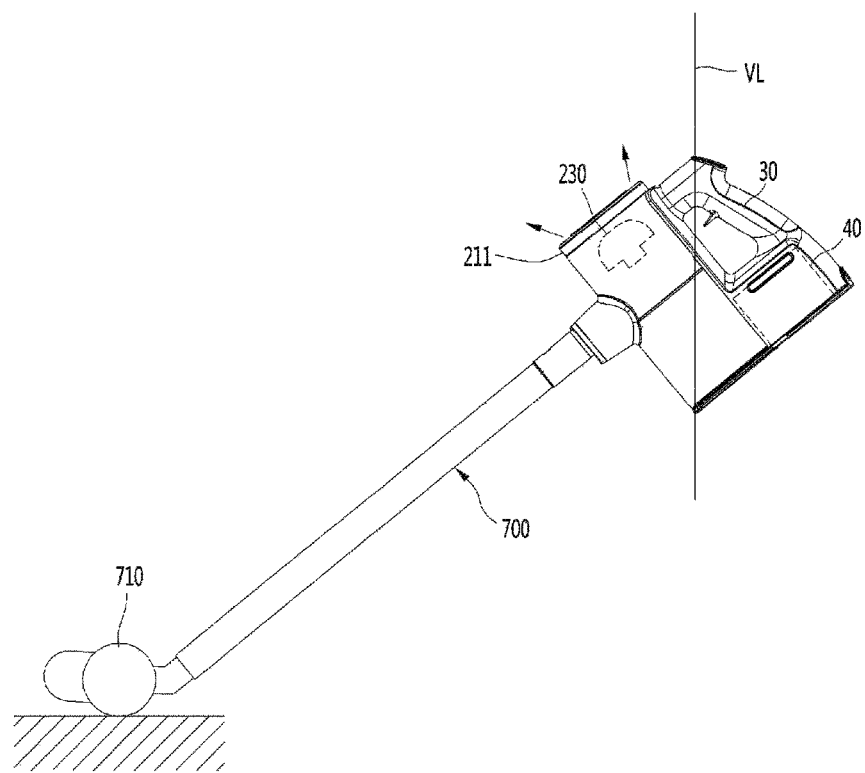
FIG. 15 is a view when the cleaner equipped with a suction nozzle is used to sweep a floor.

FIG. 15 is a view when the cleaner equipped with a suction nozzle is used to sweep a floor.

Referring to FIG. 15, an extension pipe 700 having a nozzle 710 extending from the lower end may be connected to the suction unit 5 of the cleaner 1 of the present invention.

In this state, a user can clean by moving the suction nozzle 710 on the floor.

When a user cleans using the suction nozzle 710 in the present invention, he/she can clean while changing the angle between the extension pipe 70 and the floor changing from about 45 degrees.

The suction motor 230 and the battery 40 may be positioned opposite to each other with a vertical line VL, which passes through the lowermost end of the dust container 50, therebetween. That is, the suction motor 230 is positioned at a side from the vertical line VL (for example, ahead of the vertical line VL) and the battery 40 is positioned at the other side (for example, behind the vertical line VL). The vertical line VL may pass through the handle 30.

Further, the heights of the suction motor 230 and the battery 40 from the floor are almost the same in the state shown in FIG. 15.

Accordingly, when a user holds the handle 30 and sweeps a floor, the weight of the cleaner is balanced throughout the front and rear sides from the user's hand holding the handle, thereby maintaining weight balance. In this case, the user can clean using the cleaner 1 with small force and injuries that may be applied to the user's wrist can be prevented.

Further, in the process of sweeping the floor, as in FIG. 15, the discharge cover 211 is positioned ahead of the vertical line VL and the user's hand holding the handle is positioned behind the vertical line VL. Accordingly, the air discharged through the discharge cover 211 flows away from the handle 30, so it is possible to prevent the air discharged through the discharge cover 211 from flowing to the user's hand.

Obviously, only a portion of the suction motor 30 may be positioned opposite to the battery 40 with the vertical line VL therebetween, depending on the angle between the extension pipe 700 and the floor. This case corresponds to cases when sweeping specific spaces such as window frames or couches.

Figure 16:
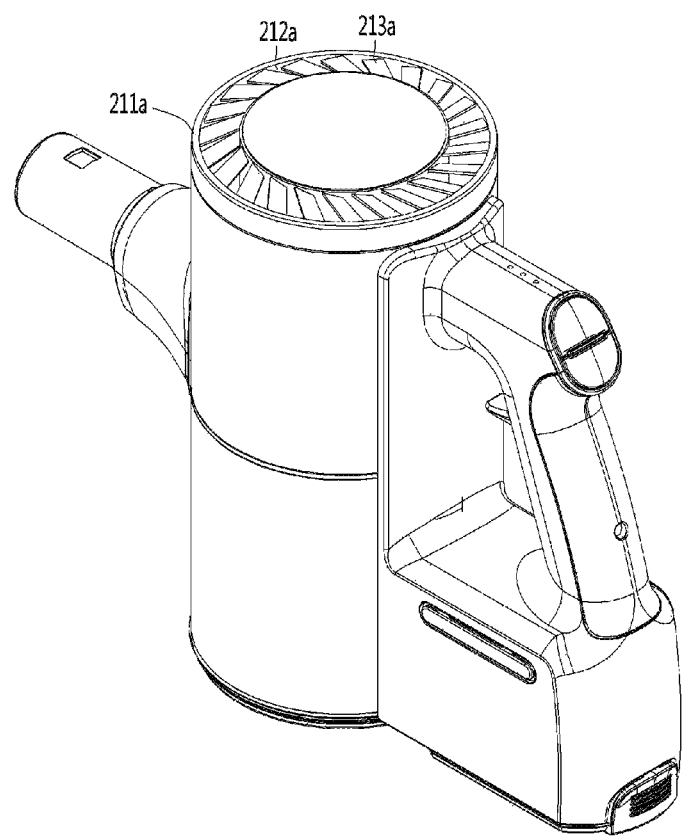
FIG. 16 is a view showing a cleaner according to another embodiment of the present invention.

FIG. 16 is a view showing a cleaner according to another embodiment of the present invention.

This embodiment is the same as the previous embodiment except for the shape of the discharge cover. Accordingly, only characteristic parts of this embodiment are described hereafter.

Referring to FIG. 16, a discharge cover 211*a* in this embodiment may have flow guides 213*a* for guiding air to be discharged.

In detail, a plurality of flow guides 213*a* is arranged with gaps in the circumferential direction of the discharge cover 211*a*. The spaces between the flow guides 213*a* function as air exits 212*a*.

The flow guides 213*a* may be inclined from a vertical line.

According to this embodiment, similarly, it is possible to prevent the air discharged from the air exits 212*a* from flowing to a user while the user cleans using a suction nozzle.

Further, the discharge cover 211*a* is disposed at the top of the cleaner, so it is possible to prevent dust around the cleaner from flying due to the air discharged from the air exits 212*a*.

Figure 17:
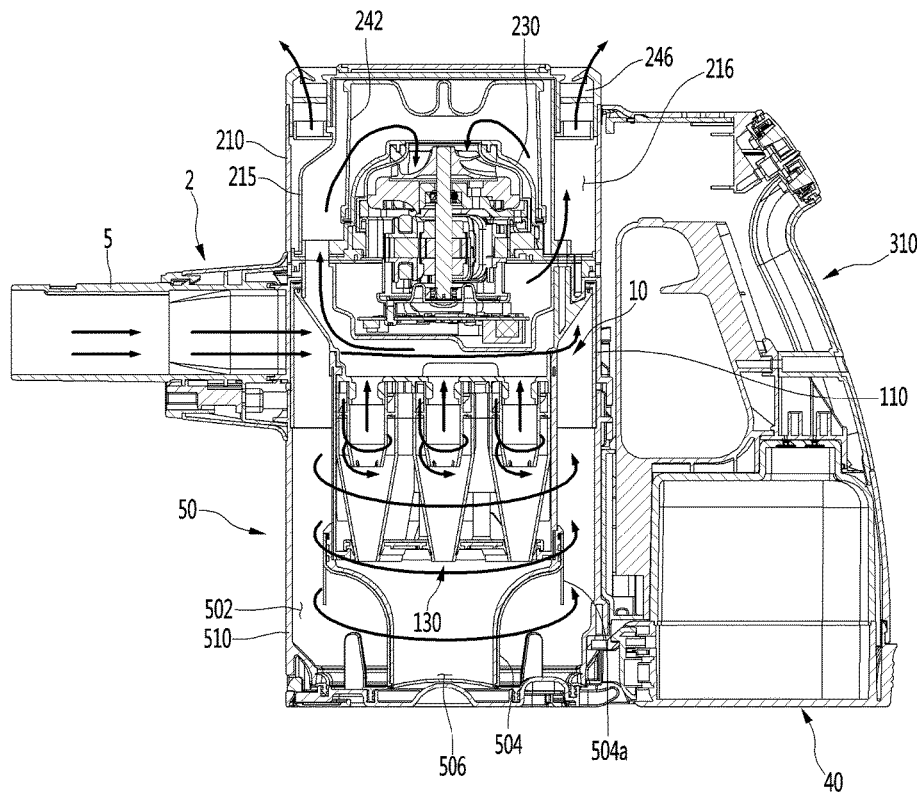
FIG. 17 is a view showing airflow in a cleaner according to another embodiment of the present invention.

FIG. 17 is a view showing airflow in a cleaner according to another embodiment of the present invention.

This embodiment is the same as the previous embodiment except for the structure of the storage guide. Accordingly, only characteristic parts of this embodiment are described hereafter.

Referring to FIG. 17, a dust storage guide 504 of this embodiment may at least partially taper downward. For example, a portion of the upper portion of the dust flow guide 504 may taper downward.

Further, the dust storage guide 504 may have an anti-flying rib 504*a* extending downward from the upper end of the dust storage guide 504. The anti-flying rib 504*a* may be formed, for example, in a cylindrical shape and may surround the upper portion of the dust storage guide 504.

Since the upper portion of the dust storage guide 504 tapers downward, a space is defined between the outer side of the upper portion of the dust storage guide 504 and the anti-flying rib 504*a*.

As described in the previous embodiment, the cyclonic flow generated along the inner side of the dust collection body 510 may move down. When the cyclonic flow comes in contact with the rib 521 on the body cover 520 while moving down, the rotating flow can be changed into rising flow by the rib 521. If there is rising flow in the first dust storage part 502, the dust in the first dust storage part 502 flies upward and flows backward into the second cyclone unit 130.

According to the present invention, rising flow in the first dust storage part 502 is changed into falling flow by the anti-flying rib 504*a* in the space between the anti-flying rib 504*a* and the upper portion of the dust storage guide 504, so the dust in the first dust storage part 502 does not fly upward and accordingly it does not flow backward into the second cyclone unit 130.

Further, since the rib 504*a* extends downward from the upper end of the dust storage guide 504, the dust separated by the cyclonic flow in the first cyclone unit 110 can be smoothly sent into the first dust storage part 502 by the anti-flying rib 504*a*.

Figure 18:
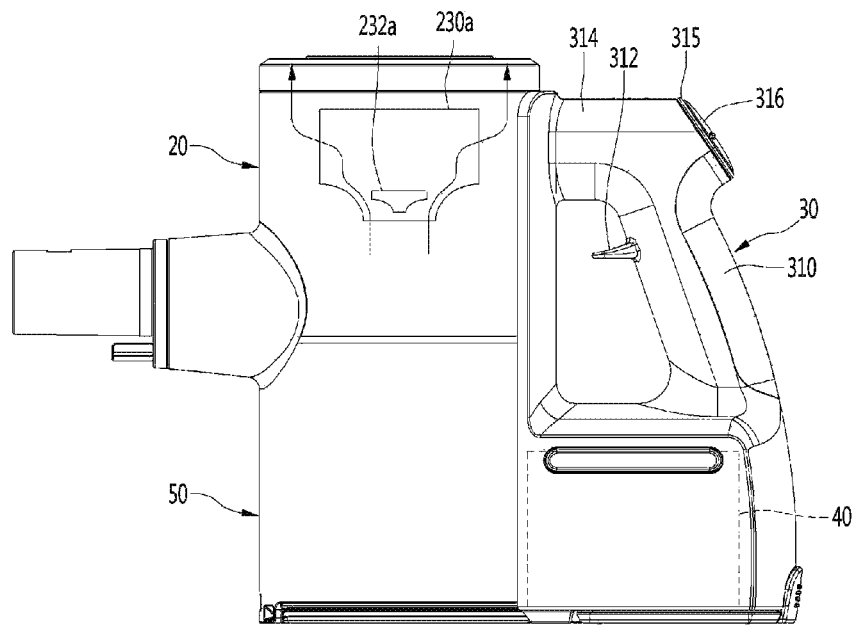
FIG. 18 is a view showing airflow in a cleaner according to another embodiment of the present invention.

FIG. 18 is a view showing airflow in a cleaner according to another embodiment of the present invention.

This embodiment is the same as the previous embodiments except for the position of the impeller in the suction motor. Accordingly, only characteristic parts of this embodiment are described hereafter.

Referring to FIGS. 8 to 18, a suction motor 230a of this embodiment is disposed in a motor housing, with an impeller 232a at a lower portion therein. That is, the suction motor 230a may be positioned with an air inlet facing the second cyclone unit 130.

According to this embodiment, the air discharged from the second cyclone unit 130 directly flow upward to the impeller 232a and the air that has passed through the impeller 232a keeps flowing upward, whereby it can be discharged out of the cleaner.

According to the arrangement of the suction motor, the channel for the air that is discharged out of the cleaner from the second cyclone unit 130 is minimized, so a flow loss is minimized.

What is claimed is:

1. A cleaner comprising:
   a suction unit configured to guide air into the cleaner;
   a suction motor that is configured to generate a suction force that suctions air into the cleaner through the suction unit;
   a dust separation unit comprising:
      a first cyclone unit configured to separate dust from air that is suctioned into the cleaner through the suction unit; and
      a second cyclone unit comprising a plurality of cyclone bodies that are configured to secondarily separate dust from air that is discharged from the first cyclone unit;
   a cleaner body that is configured to accommodate the suction motor, and that has a first opening that provides access to an interior of the cleaner body;
   an exhaust filter that is configured to be detachably coupled to the cleaner body at the first opening of the cleaner body, the exhaust filter configured to receive and filter air that has passed through the suction motor;
   a filter cover that is configured to cover the first opening of the cleaner body at which the exhaust filter is configured to be coupled;
   a pre-filter that circumferentially surrounds at least part of the suction motor, and that is configured to filter air that was discharged from the second cyclone unit of the dust separation unit and before the air enters the suction motor; and
   a dust container that is configured to store dust that is separated by the dust separation unit and that comprises a dust cover configured to cover a second opening of the dust container that provides access to an interior of the dust container,
   wherein the second opening of the dust container and the first opening of the cleaner body are located on opposite sides of the dust separation unit, with an axis of a first cyclonic flow of the first cyclone unit configured to pass through the first opening and through the second opening, and
   wherein, in a state in which the first opening is uncovered, the pre-filter is configured to be inserted through the first opening to surround at least part of the suction motor.

2. The cleaner of claim 1, wherein the first opening provides access to the interior of the cleaner body in a first direction, and the second opening provides access to the interior of the dust container in a second direction that is opposite to the first direction.

3. The cleaner of claim 1, wherein, in a state in which the filter cover is opened to uncover the first opening and the dust cover is opened to uncover the second opening:
   the first opening is configured to face in a first direction and the second opening is configured to face in a second direction that is opposite to the first direction.

4. The cleaner of claim 1, wherein the suction motor is disposed between the exhaust filter and the dust container.

5. The cleaner of claim 1, wherein the dust container comprises a dust storage guide that is configured to partition an internal space of the dust container into (i) a first dust storage unit configured to store dust separated in the first cyclone unit, and (ii) a second dust storage unit configured to store dust separated in the second cyclone unit.

6. The cleaner of claim 1, wherein the suction motor includes a rotary impeller, the suction motor configured to drive a rotation of the rotary impeller via an impeller shaft to generate the suction force that suctions the air into the cleaner through the suction unit, and
   wherein the rotary impeller is disposed at a first end of the suction motor and the second cyclone unit is disposed at a second end of the suction motor opposite the first end.

7. The cleaner of claim 6, wherein the suction motor has at least one opening through which air around the suction motor flows into the suction motor and subsequently flows through the rotary impeller, and
   wherein an outer surface of the suction motor defines an air passage that guides air that was discharged from the second cyclone unit into the suction motor through the at least one opening of the suction motor.

8. The cleaner of claim 1, wherein removing the filter cover and the exhaust filter from the cleaner body exposes at least part of the pre-filter to an outside of the cleaner body.

9. The cleaner of claim 1, wherein, in a state in which the filter cover is opened to uncover the first opening and the dust cover is opened to uncover the second opening:
   the exhaust filter is configured to be inserted into the first opening of the cleaner body in a first direction, and
   the dust container is configured to release the dust stored therein through the second opening in the first direction.

10. The cleaner of claim 1, further comprising a handle that is configured to be held by a user to operate the cleaner using only one hand,
    wherein the handle comprises a stopper that is configured to be arranged between an index finger and middle finger of a hand of the user in a state in which the handle is held by the user.

11. The cleaner of claim 6, further comprising a printed circuit board (PCB) that is operably connected to the suction motor, and that is disposed between the rotary impeller and the dust separation unit.

12. The cleaner of claim 11, wherein the PCB is disposed at a first end of the suction motor, and the exhaust filter is disposed at a second end of the suction motor opposite the first end.

13. The cleaner of claim 1, wherein the dust container is at least partially transparent to provide visual access to an interior of the dust container from an outside of the cleaner.

14. A cleaner comprising:
    a suction unit configured to guide air into the cleaner;
    a suction motor that is configured to generate a suction force that suctions air into the cleaner through the suction unit;
    a dust separation unit comprising:
       a first cyclone unit configured to separate dust from air that is suctioned into the cleaner through the suction unit; and a second cyclone unit comprising a plurality of cyclone bodies that are configured to secondarily separate dust from air that is discharged from the first cyclone unit;

a cleaner body that is configured to accommodate the suction motor, and that has a first opening that provides access to an interior of the cleaner body;

an exhaust filter that is configured to be detachably coupled to the cleaner body at the first opening of the cleaner body, the exhaust filter configured to receive and filter air that has passed through the suction motor;

a filter cover that is configured to cover the first opening of the cleaner body at which the exhaust filter is configured to be coupled;

a pre-filter that circumferentially surrounds at least part of the suction motor, and that is configured to filter air that was discharged from the second cyclone unit of the dust separation unit and before the air enters the suction motor; and a dust container that is configured to store dust that is separated by the dust separation unit and that comprises a dust cover configured to cover a second opening of the dust container that provides access to an interior of the dust container, wherein the second opening of the dust container and the first opening of the cleaner body are located on opposite sides of the dust separation unit, wherein, in a state in which the first opening is uncovered, the pre-filter is configured to be inserted through the first opening to surround at least part of the suction motor, and wherein, in a state in which an axis of a first cyclonic flow of the first cyclone unit is arranged longitudinally along a vertical direction, and in which the filter cover is opened to uncover the first opening and the dust cover is opened to uncover the second opening:

the first opening is configured to face in an upward direction and the second opening is configured to face in a downward direction.

15. The cleaner of claim 14, wherein, in the state in which the axis of the first cyclonic flow of the first cyclone unit is arranged longitudinally along the vertical direction, and in which the filter cover is opened to uncover the first opening and the dust cover is opened to uncover the second opening:

the exhaust filter is configured to be inserted into the first opening of the cleaner body in a downward direction, and the dust container is configured to release the dust stored therein through the second opening in the downward direction.

16. The cleaner of claim 14, wherein, in the state in which the axis of the first cyclonic flow of the first cyclone unit is arranged longitudinally along the vertical direction, the suction motor is disposed below the exhaust filter and above the dust container.

17. The cleaner of claim 14, wherein the dust container comprises a dust storage guide that is configured to partition an internal space of the dust container into (i) a first dust storage unit configured to store dust separated in the first cyclone unit, and (ii) a second dust storage unit configured to store dust separated in the second cyclone unit.

18. The cleaner of claim 14, wherein the suction motor includes a rotary impeller, the suction motor being configured to drive a rotation of the rotary impeller via an impeller shaft to generate the suction force that suctions the air into the cleaner through the suction unit, and wherein, in the state in which the axis of the first cyclonic flow of the first cyclone unit is arranged longitudinally along the vertical direction, the rotary impeller is disposed at an upper end of the suction motor and the second cyclone unit is disposed at a lower end of the suction motor.

19. The cleaner of claim 18, wherein the suction motor has at least one opening through which air around the suction motor flows into the suction motor and subsequently flows through the rotary impeller, and wherein an outer surface of the suction motor defines an air passage that guides air that was discharged from the second cyclone unit into the suction motor through the at least one opening of the suction motor.

20. The cleaner of claim 14, wherein removing the filter cover and the exhaust filter from the cleaner body exposes at least part of the pre-filter to an outside of the cleaner body.

21. The cleaner of claim 14, further comprising a handle that is configured to be held by a user to operate the cleaner using only one hand, wherein the handle comprises a stopper that is configured to be arranged between an index finger and middle finger of a hand of the user in a state in which the handle is held by the user.

22. The cleaner of claim 18, further comprising a printed circuit board (PCB) that is operably connected to the suction motor, wherein, in the state in which the axis of the first cyclonic flow of the first cyclone unit is arranged longitudinally along the vertical direction, the PCB is disposed below the rotary impeller and above the dust separation unit.

23. The cleaner of claim 22, wherein, in the state in which the axis of the first cyclonic flow of the first cyclone unit is arranged longitudinally along the vertical direction, the PCB is disposed at a lower end of the suction motor, and the exhaust filter is disposed at an upper end of the suction motor.

24. The cleaner of claim 14, wherein the dust container is at least partially transparent to provide visual access to an interior of the dust container from an outside of the cleaner.

25. The cleaner of claim 14, wherein, in the state in which the axis of the first cyclonic flow of the first cyclone unit is arranged longitudinally along the vertical direction, the first opening of the cleaner body is located above the dust separation unit, and the second opening of the dust container is located below the dust separation unit, and wherein the axis of the first cyclonic flow of the first cyclone unit is configured to pass through the first opening and through the second opening.

26. The cleaner of claim 14, wherein, in the state in which the axis of the first cyclonic flow of the first cyclone unit is arranged longitudinally along the vertical direction:

the first opening provides access to the interior of the cleaner body in a downward direction, and the second opening provides access to the interior of the dust container in an upward direction.

27. The cleaner of claim 6, wherein the pre-filter circumferentially surrounds at least a part of the rotary impeller.

28. The cleaner of claim 6, wherein, in a state in which the cleaner is oriented with the impeller shaft arranged longitudinally along a vertical direction, the second cyclone unit is disposed below the suction motor.

29. The cleaner of claim 18, wherein the pre-filter circumferentially surrounds at least a part of the rotary impeller.

30. The cleaner of claim 18, wherein, in a state in which the cleaner is oriented with the impeller shaft arranged longitudinally along a vertical direction, the second cyclone unit is disposed below the suction motor.

\* \* \* \* \*